United States Patent
Thomas

(10) Patent No.: US 10,222,073 B2
(45) Date of Patent: Mar. 5, 2019

(54) CONCEALED HEATING SYSTEM

(71) Applicant: Roger Thomas, Brooklyn, NY (US)

(72) Inventor: Roger Thomas, Brooklyn, NY (US)

( * ) Notice: Subject to any disclaimer, the term of this patent is extended or adjusted under 35 U.S.C. 154(b) by 0 days.

(21) Appl. No.: 15/440,123

(22) Filed: Feb. 23, 2017

(65) Prior Publication Data

US 2017/0248323 A1     Aug. 31, 2017

Related U.S. Application Data

(60) Provisional application No. 62/299,715, filed on Feb. 25, 2016.

(51) Int. Cl.
*F24D 3/14*     (2006.01)

(52) U.S. Cl.
CPC .................................. *F24D 3/145* (2013.01)

(58) Field of Classification Search
CPC .. F24D 3/145; F24D 3/147; F24F 1/00; F24F 5/0089; F24F 5/0092; F24F 13/0227; F24F 2001/0037; F24F 2001/004; F24F 2001/0048; F24F 12/001; F24F 12/006; F24F 13/08
USPC ... 165/56, 47, 48.1, 48.2, 49, 53, 54, 55, 57
See application file for complete search history.

(56) References Cited

U.S. PATENT DOCUMENTS

| | | | | |
|---|---|---|---|---|
| 1,662,993 A | * | 3/1928 | Williams | F28D 1/0246 |
| | | | | 165/56 |
| 1,798,892 A | * | 3/1931 | Murray, Jr. | F24D 19/0002 |
| | | | | 126/90 R |
| 1,855,565 A | * | 4/1932 | Bennett | F24D 19/04 |
| | | | | 165/55 |
| 1,859,056 A | * | 5/1932 | Seelert | F24D 3/147 |
| | | | | 165/129 |
| 1,884,096 A | | 10/1932 | Modine | |
| 1,907,527 A | * | 5/1933 | Erskine | F28D 1/0233 |
| | | | | 165/168 |
| 1,914,197 A | * | 6/1933 | Davis, Jr. | F28D 1/0477 |
| | | | | 165/129 |
| 1,914,917 A | * | 6/1933 | Hathaway | D03D 39/06 |
| | | | | 139/10 |
| 1,927,991 A | * | 9/1933 | Pendleton | F24D 19/0002 |
| | | | | 165/129 |
| 1,951,521 A | | 3/1934 | Mussey | |
| 5,910,267 A | | 6/1999 | Stricker | |
| 9,410,706 B2 | * | 8/2016 | Ferlay | F24D 3/16 |
| 2002/0025144 A1 | | 2/2002 | Baribeault et al. | |
| 2010/0071872 A1 | * | 3/2010 | Fischer | F24D 3/14 |
| | | | | 165/53 |

OTHER PUBLICATIONS

International Search Report for PCT/2017/019291 dated May 5, 2017.

* cited by examiner

*Primary Examiner* — Justin M Jonaitis
(74) *Attorney, Agent, or Firm* — Arent Fox LLP

(57) ABSTRACT

A concealed heating system that includes one or more heating units. Each heating unit has a frame that enables the heating units to be stacked against one another and to be attached to framing members of a wall. Each heating unit also includes a housing that is attached to the frame. The housing extends into the wall to define a recess portion through which a heat supply pipe with heat-dissipating fins attached thereto extends.

10 Claims, 4 Drawing Sheets

CONCEALED HEATING SYSTEM

CROSS REFERENCE TO RELATED APPLICATION

This application claims the benefit of U.S. Provisional Application No. 62/299,715, filed Feb. 25, 2016, which is incorporated herein by reference in its entirety.

BACKGROUND

Providing heat to the inside of a dwelling or other building is important so that people can live or work in a comfortable environment that is not too cold. Heating systems such as baseboard heaters or steam radiators have been used as a source of heat. However, since these types of systems are installed along the floor and typically against a wall, their use often reduces the useable floor space in the room in which they are installed. This is a particular problem in locations such as urban apartments where useable square footage is in high demand. In addition, these types of systems create tripping hazards, are unsightly, and can be easily damaged since they protrude into the room.

SUMMARY

In light of these problems, the present invention is directed towards a concealed heating system that, when installed, allows for a larger useable square footage compared to baseboard heaters and steam radiators while still providing adequate heat to the dwelling.

A concealed heating system with one or more heating units is provided herein. In this system, a stackable frame is constructed to hold a housing, and for attachment to framing members of a wall or to the frame of another heating unit. In a preferred embodiment, the ends of each stackable frame included in the concealed heating system are equipped with holes configured for attachment to the framing members of the wall or for attachment to the frame of another heating unit. The housing extends into the wall to define a recess portion. The heat supply pipe extends through the recess portion and has a plurality of heat-dissipating fins attached thereto. The heat supply pipe and the plurality of heat-dissipating fins may be arranged horizontally or vertically.

In some embodiments, each heating unit of the concealed heating system further includes a cover removably attached thereto. In one embodiment, the cover is attached to the heating unit such that a lower opening is larger than an upper opening.

DETAILED DESCRIPTION OF THE INVENTION

Figure 1:
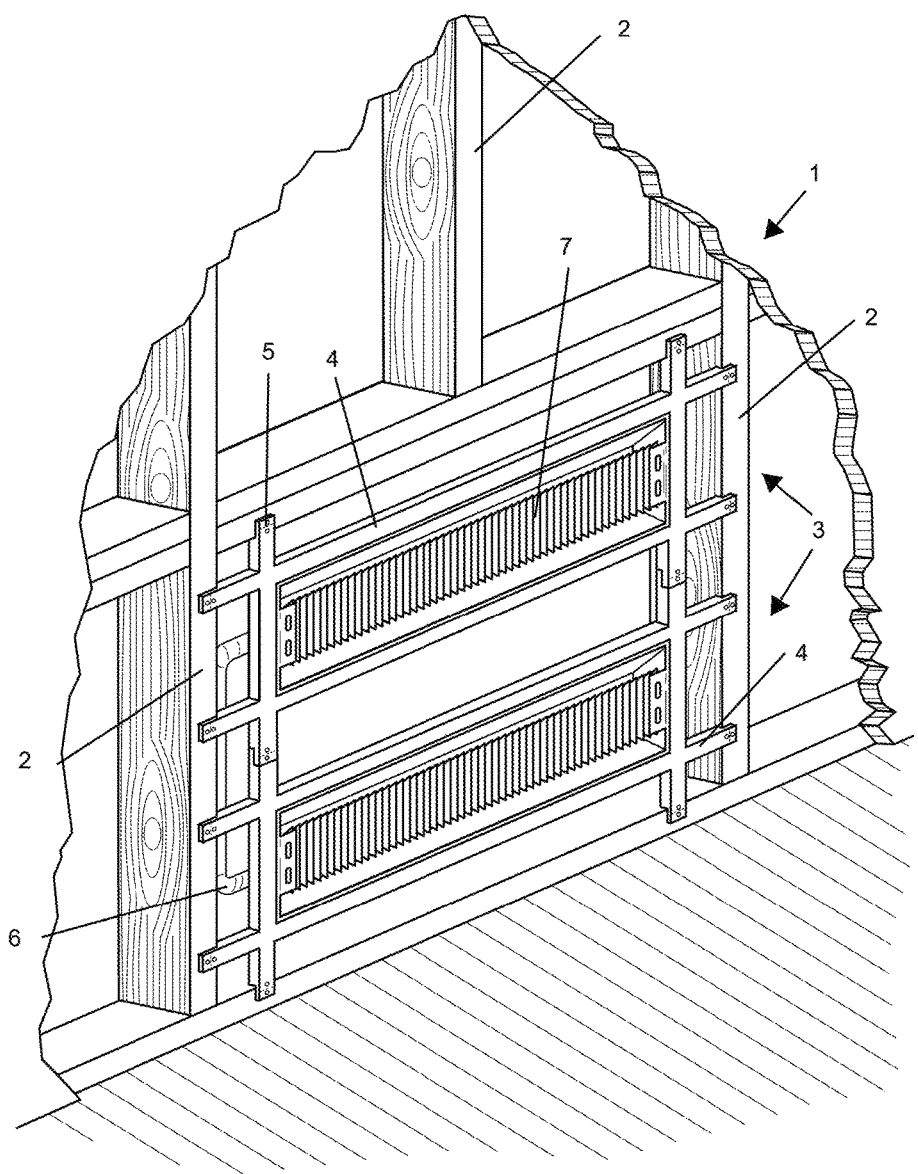
FIG. 1 shows a concealed heating system in accordance with an embodiment of the present invention attached to framing members of a wall.
Figure 2:
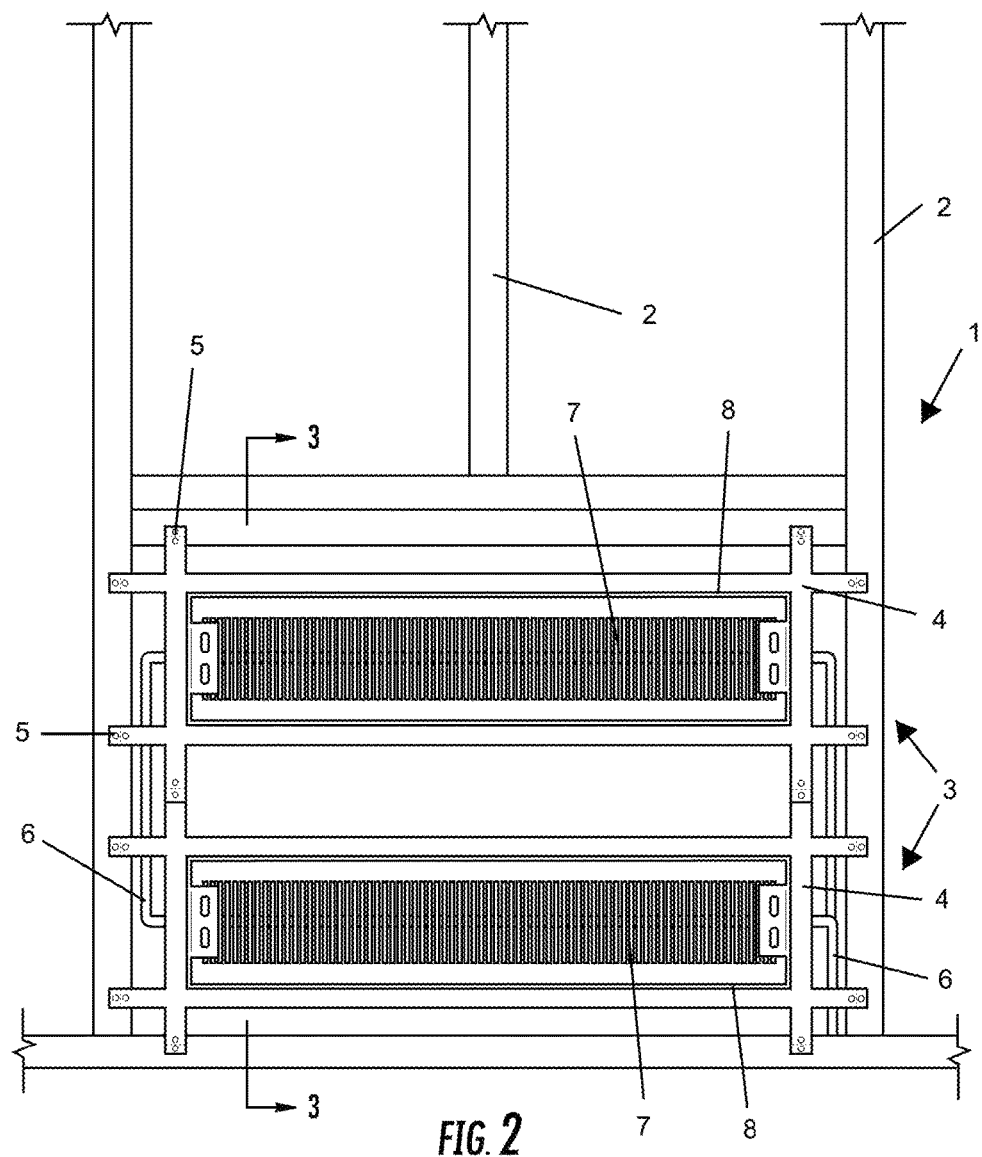
FIG. 2 is a front view of the concealed heating system of FIG. 1.
Figure 3:
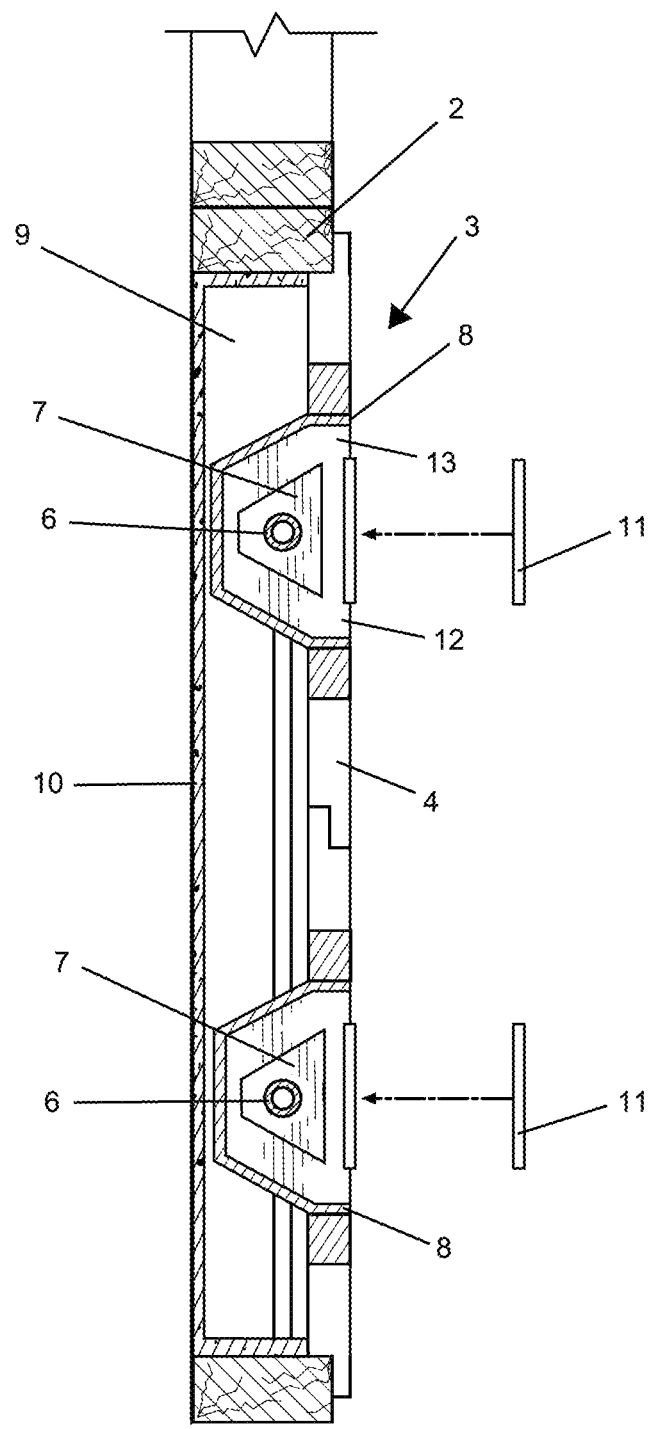
FIG. 3 is a cross-sectional view of the concealed heating system of FIG. 1 along line 3-3.

Referring now to the attached drawings, FIGS. 1-3 show a preferred embodiment of the concealed heating system of the present invention. As shown in FIGS. 1-3, the heating system 1 is designed to be installed between wall studs 2 and recessed within an exterior (or interior) wall of the dwelling. These wall studs can be wood, metal, or any other building material that is used in construction.

The particular installation shown in FIGS. 1-3 includes two heating units 3 stacked on top of each other. Each heating unit 3 includes a stackable frame 4. The ends of the frame 4 have holes 5 provided therein for attachment to the wall studs 2 and to any adjacent stacked frame 4 of another heating unit 3. The ends of the frame 4 also preferably have perforations which allow for easy trimming of the frame 4 so that it can fit with various width stud separations, such as 12 inch, 16 inch or 24 inch on-center stud placement.

The heating unit 3 includes piping 6 for the supply of heated water or steam from the HVAC or other appliance to the heating unit 3. This piping 6 is preferably made of copper, but can also be other materials such as PEX (cross-linked polyethylene) tubing, CPVC (chlorinated polyvinyl chloride), PP (polypropylene), stainless steel or aluminum. A plurality of heat-dissipating fins 7 are attached to the portion of the piping 6 that runs horizontally through each heating unit 3. It is preferred that these heat-dissipating fins 7 are made from aluminum. The shape of the heat-dissipating fins can be square, circular, triangular or any other shape desired.

A housing 8 is attached to the frame 4 so as to define a recess portion and surround the plurality of heat-dissipating fins 7 on all sides except the side facing into the dwelling. The housing 8 is preferably made of steel, aluminum or other heat conducting material so as to assist with the dissipation of heat described in more detail below. As can be seen in FIG. 3 (which is a cross section along line 3-3 of FIG. 2), the housing 8 defines a space 9 between the housing 8 and the inside of the wall within which the heating unit 3 is installed. If this is an exterior wall, it is preferred that an insulating material 10 be provided between the inside of the wall and the heating unit 3.

Figure 4:
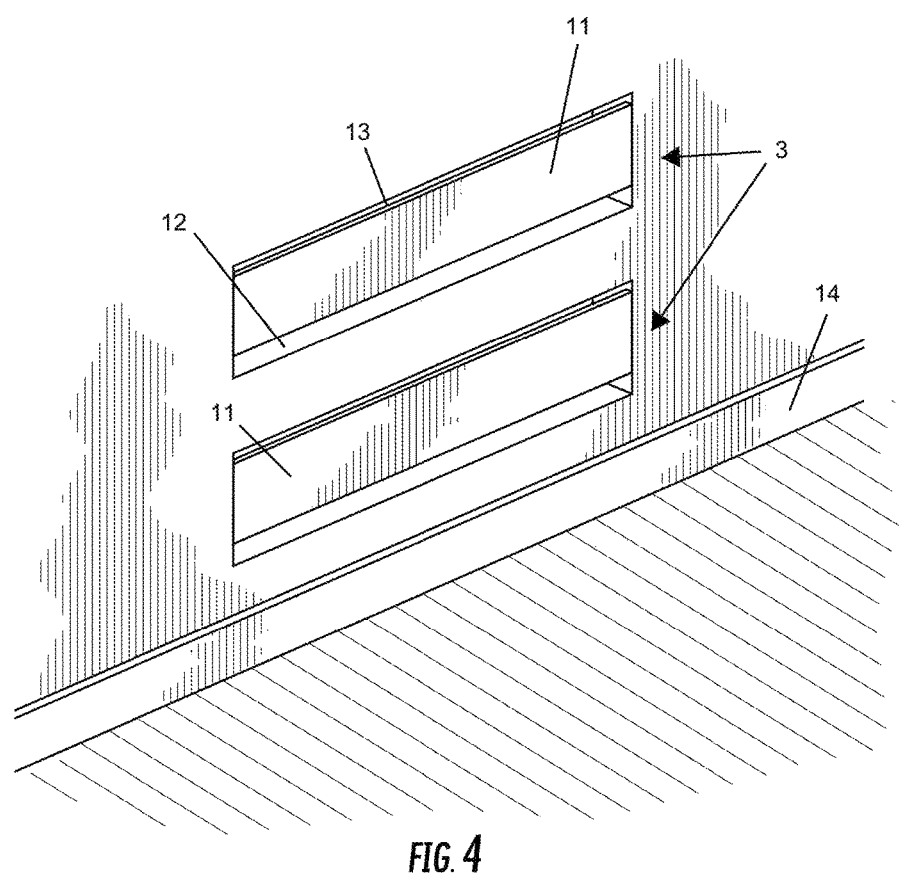
FIG. 4 is a perspective view of the concealed heating system of FIG. 1 where the heating units are within a finished wall and include a cover.

As shown in FIGS. 3 and 4, the heating unit is also provided with a removable cover 11. The cover 11 is preferably made of steel, aluminum or other heat conducting material so as to assist with the dissipation of heat. The cover 11 is removable to allow for cleaning and/or replacement of the cover 11 due to damage or aesthetic reasons. For example, depending on the stylistic preferences, the cover 11 can be changed so as to match the décor or aesthetic appeal of the person residing in the dwelling.

The cover 11 is preferably attached to the heating unit 3 such that a lower opening 12 is larger than an upper opening 13. In a preferred embodiment, the lower opening 12 is 1¼ inches wide and the upper opening 13 is 1 inch wide. This difference in opening width assists in convection heating by allowing cool air to be drawn into the lower opening 12 and exited the upper opening. Other dimensions can be used for the openings depending on the convection characteristics desired from the heating unit. Also, the cover can be configured to span across the heating unit without defining an upper or lower opening. In such a configuration, the cover can be provided with perforations or other openings therein for aesthetic purposes or to assist in the dissipation of heat.

As further shown in FIG. 4, the heating units 3 are preferably installed at a location above the baseboard trim molding 14 of the room in which they are located. This provides the added advantage of allowing the room to be designed with a finished and uniform overall appearance without interfering with the decorative moldings such as what happens with traditional baseboard heaters. Also, since the heating units 3 of the present invention are recessed into the wall, the remainder of the wall around the heating units 3 can be easily finished with standard sheetrock. Moreover, the heating units 3 can be installed at various heights to not only provide heat, but to create an overall decorative design.

It should also be noted that while FIGS. 1-4 show the heating units 3 configured and installed such that the plurality of heat-dissipating fins 7 and portion of the piping 6 to which the heat-dissipating fins 7 are attached extend in a horizontal direction, it is possible to install the heating units 3 such that the plurality of heat-dissipating fins 7 and portion of the piping 6 to which the heat-dissipating fins 7 are attached extend in a vertical direction.

What is claimed is:

1. A heating unit, comprising:
   a frame having a first side, a second side opposite the first side, a first set of ends having a first plurality of holes and configured for attachment to framing members of a wall, and a second set of ends having a second plurality of holes and configured for attachment to a second frame of an adjacent heating unit in a stacked arrangement;
   a housing attached to the frame and defining a recessed portion between the housing and the second side of the frame; and
   a heat supply pipe extending through the recessed portion,
   wherein the first set of ends further includes perforations configured to facilitate trimming of the frame so that the frame fits between framing members having a stud separation selected from 12 inch, 16 inch, and 24 inch on-center stud placement.

2. A heating system, comprising:
   one or more heating units, wherein each heating unit comprises:
      a frame comprising a plurality of ends, wherein the ends comprise a plurality of holes configured for attachment to one or more framing members of a wall and to another frame of an adjacent heating unit in a stacked arrangement;
      a housing attached to the frame and defining a recessed portion;
      a heat supply pipe extending through the recessed portion of the housing; and
      a plurality of heat-dissipating fins attached to the heat supply pipe,
      wherein at least one set of ends further includes perforations configured to facilitate trimming of the frame so that the frame fits between framing members having a stud separation selected from 12 inch, 16 inch, and 24 inch on-center stud placement.

3. The heating unit of claim 1, further comprising a plurality of heat-dissipating fins on the heat supply pipe.

4. The heating unit of claim 1, further comprising a cover removably attached to the frame at the first side thereof.

5. The heating unit of claim 4, wherein the cover is removably attached to the frame so as to define a lower opening and an upper opening.

6. The heating unit of claim 5, wherein the lower opening is larger than the upper opening.

7. The heating unit of claim 1, wherein each of the first set of ends include a respective plurality of first holes configured for attachment to the framing members of the wall.

8. The heating system of claim 2, wherein the plurality of ends comprises a plurality of horizontal ends and a plurality of vertical ends, wherein the horizontal ends include a plurality of first holes configured for attachment to the one or more framing members of the wall, and the vertical ends include a plurality of second holes configured for attachment to the one or more framing members of the wall or to a frame of an adjacent heating unit of the one or more heating units.

9. The heating system of claim 8, wherein each of the one or more heating units further comprises a cover removably attached thereto so as to define a lower opening and an upper opening.

10. The heating system of claim 9, wherein the lower opening is larger than the upper opening.

* * * * *